(12) United States Patent
Gmirya

(10) Patent No.: US 10,746,253 B2
(45) Date of Patent: Aug. 18, 2020

(54) VIBRATION DAMPING DEVICE FOR AN ELONGATED MEMBER

(71) Applicant: Sikorsky Aircraft Corporation, Stratford, CT (US)

(72) Inventor: Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 311 days.

(21) Appl. No.: 15/752,813

(22) PCT Filed: Jun. 14, 2016

(86) PCT No.: PCT/US2016/037371
§ 371 (c)(1),
(2) Date: Feb. 14, 2018

(87) PCT Pub. No.: WO2017/030641
PCT Pub. Date: Feb. 23, 2017

(65) Prior Publication Data
US 2018/0238417 A1 Aug. 23, 2018

Related U.S. Application Data

(60) Provisional application No. 62/207,578, filed on Aug. 20, 2015.

(51) Int. Cl.
*F16F 15/123* (2006.01)
*F16F 15/121* (2006.01)
(Continued)

(52) U.S. Cl.
CPC .......... *F16F 15/123* (2013.01); *B64C 27/001* (2013.01); *B64C 27/12* (2013.01);
(Continued)

(58) Field of Classification Search
CPC .......... F16F 15/123; F16F 15/12; F16F 15/10; F16F 15/121; F16F 15/322; B64C 27/001;
(Continued)

(56) References Cited

U.S. PATENT DOCUMENTS 3,075,406 A 1/1963 Butler, Jr. et al.
3,716,650 A * 2/1973 de Mecquenem ....... H02G 7/12
74/502.6
(Continued)

FOREIGN PATENT DOCUMENTS

EP 0342970 A2 11/1989
JP 55-119213 A * 9/1980 .................. 74/502.5

OTHER PUBLICATIONS

PCT ISR Written Opinion; International Application No. PCT/US2016/037371; International Filing Date: Jun. 14, 2016, dated Sep. 1, 2016, pp. 1-4.
(Continued)

*Primary Examiner* — Greg Binda
(74) *Attorney, Agent, or Firm* — Cantor Colburn LLP

(57) ABSTRACT

A vibration damping device is configured to reduce vibration that causes lateral flexing of an elongated member that extends along a centerline. The device includes a split sleeve co-extending with and disposed about the elongated member, and a spring that extends about the sleeve and exerts a force that biases the sleeve radially inward.

13 Claims, 5 Drawing Sheets

(51) Int. Cl.
*F16F 15/10* (2006.01)
*F16F 15/12* (2006.01)
*B64C 27/00* (2006.01)
*B64C 27/12* (2006.01)
*F16F 15/32* (2006.01)

(52) U.S. Cl.
CPC .............. *F16F 15/10* (2013.01); *F16F 15/12* (2013.01); *F16F 15/121* (2013.01); *F16F 15/322* (2013.01); *Y10T 74/2045* (2015.01); *Y10T 74/20456* (2015.01)

(58) Field of Classification Search
CPC ................. B64C 27/12; Y10T 74/2045; Y10T 74/20456
USPC ................. 464/52; 248/565; 74/502.4, 502.5
See application file for complete search history.

(56) References Cited

U.S. PATENT DOCUMENTS

| | | |
|---|---|---|
| 4,411,346 A | 10/1983 | Witt |
| 5,145,143 A | 9/1992 | Jackson et al. |
| 5,354,237 A | 10/1994 | Amborn et al. |
| 6,725,985 B2 | 4/2004 | Haneishi et al. |
| 8,720,258 B2 | 5/2014 | Meisner et al. |
| 2007/0260424 A1 | 11/2007 | Brown et al. |
| 2008/0178600 A1 | 7/2008 | Healy et al. |
| 2013/0103373 A1 | 4/2013 | Benayon et al. |
| 2015/0032788 A1 | 1/2015 | Velazquez et al. |

OTHER PUBLICATIONS

PCT Notification of Transmittal of the International Search Report; International Application No. PCT/US2016/037371; International Filing Date: Jun. 14, 2016, dated Sep. 1, 2016, pp. 1-10.

* cited by examiner

VIBRATION DAMPING DEVICE FOR AN ELONGATED MEMBER

CROSS REFERENCE TO RELATED APPLICATIONS

This application is a National Stage application of PCT/US2016/037371, filed Jun. 14, 2016, which claims the benefit of U.S. Provisional Application No. 62/207,578, filed Aug. 20, 2015, both of which are incorporated by reference in their entirety herein.

STATEMENT REGARDING FEDERALLY SPONSORED RESEARCH OR DEVELOPMENT

This invention was made with government support with the United States Navy under Contract No.: N00019-06-C-0081. The government therefore has certain rights in this invention.

BACKGROUND

The present disclosure relates to a vibration damping device, and more particularly, to a vibration damping device for an elongated member.

Elongated members generally of any variety may experience varying vibration modes over a range of frequencies. Such vibrations are known to cause lateral flexing of the member that may over a period of time cause member fatigue and/or failure of the member and/or adjacent components. Moreover, if vibration frequencies are similar to the natural resonating frequency of the member, more drastic flexing may occur. A wide range of known vibration damping devices may reduce some or most of vibration-induced flexing of the member; however, due to a large number of member applications, further improvements and/or designs of vibration damping devices is desirable.

SUMMARY

A vibration damping device for reducing lateral displacement of an elongated member extending along a centerline according to one, non-limiting, embodiment of the present disclosure includes, a split sleeve co-extending with and disposed about the elongated member; and a first spring extending about the sleeve and configured to exert a force that biases the sleeve radially inward.

Additionally to the foregoing embodiment, the sleeve is bisected longitudinally into separate first and second segments.

In the alternative or additionally thereto, in the foregoing embodiment, each of the first and second segments span circumferentially between opposite first and second edges, and wherein the first edge of the first segment opposes the second edge of the second segment and the second edge of the first segment opposes the first edge of the first segment.

In the alternative or additionally thereto, in the foregoing embodiment, wherein the first edge of the first segment and the second edge of the second segment define a first gap there-between when in an un-flexed state, and define a second gap that is larger than the first gap when in a flexed state against the biasing force of the first spring.

In the alternative or additionally thereto, in the foregoing embodiment, the second edge of the first segment and the first edge of the second segment define a third gap there-between when in the un-flexed state, and define a fourth gap that is larger than the third gap when in the flexed state against the biasing force of the first spring In the alternative or additionally thereto, in the foregoing embodiment, the first and second segments are geometrically identical.

In the alternative or additionally thereto, in the foregoing embodiment, the first spring is a coiled spring constructed and arranged to helically wrap about the sleeve.

In the alternative or additionally thereto, in the foregoing embodiment, the device includes a second coiled spring including a plurality of coils with each coil extending circumferentially about the sleeve, and wherein each coil is axially adjacent to and spaced from a respective coil of a plurality of coils of the first spring.

In the alternative or additionally thereto, in the foregoing embodiment, the first spring is a coiled spring and is disposed at least in part in a groove defined by the sleeve.

In the alternative or additionally thereto, in the foregoing embodiment, the sleeve includes a collar projecting radially outward and the groove is defined by the collar.

In the alternative or additionally thereto, in the foregoing embodiment, the vibration damping device is part of a drive system quill assembly, the elongated member is a connecting rod of the drive system quill assembly, and the centerline is a rotational axis.

A gear train according to another, non-limiting, embodiment includes a first gear orientated to rotate about an axis; a second gear orientated to rotate about the axis; and a quill assembly extending axially between the first and second gears, and including a quill shaft engaged to the first and second gears and including a plurality of segments, a connecting rod concentrically disposed inside the shaft and configured to hold the plurality of segments axially together, a split sleeve disposed about the connecting rod, and a first spring extending about the sleeve for exerting a force that biases the sleeve radially inward for damping vibration.

Additionally to the foregoing embodiment, the rod is under tension and at least one segment of the plurality of segments of the quill shaft carries a torque.

In the alternative or additionally thereto, in the foregoing embodiment, the gear train is part of a split torque gear box.

In the alternative or additionally thereto, in the foregoing embodiment, the split torque gear box is a helicopter split torque gear box.

In the alternative or additionally thereto, in the foregoing embodiment, the connecting rod has an axial length over diameter ratio of about greater than ten.

A method of installing a vibration damping device onto an elongated member extending along a centerline according to another, non-limiting embodiment includes, installing first and second segments of a sleeve about the elongated member from opposite radial directions; and installing a spring about the sleeve.

Additionally to the foregoing embodiment, the method includes placing at least a portion of the spring in a groove defined by the sleeve for axially indexing the spring.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
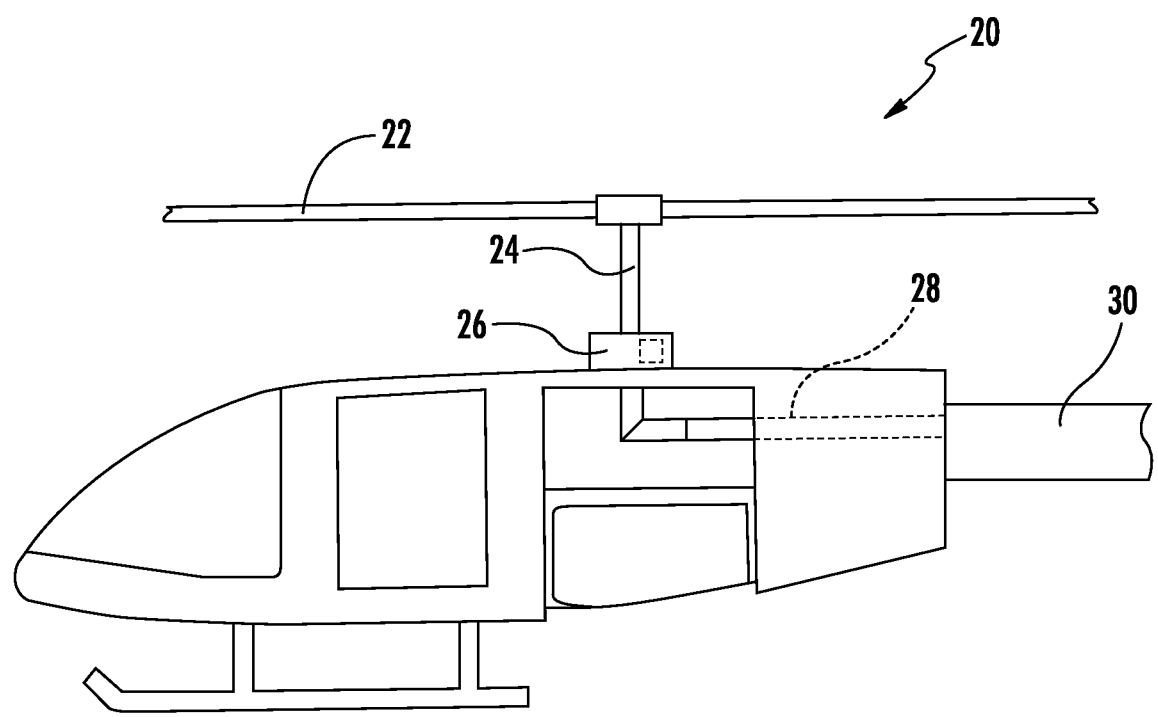
FIG. 1 is a side view of a helicopter as one, non-limiting, application of a gear train as one, non-limiting, exemplary embodiment of the present disclosure.

Referring to FIG. 1, one, non-limiting, example of an application of the present disclosure is illustrated as a rotary wing aircraft 20 (e.g., helicopter) having a rotor 22, an output shaft 24, a drive system or gearbox 26, an input shaft 28 and an engine 30. The engine 30 is configured to provide power to the gearbox 26 via the input shaft 28. Rotational energy of the input shaft 28 is transferred to the gearbox 26 which, in-turn, is transferred to the output shaft 24 at a desired speed for controlled rotation of the rotor 22. The gearbox 26 may be any variety of known gearboxes including a split torque gearbox.

Figure 2:
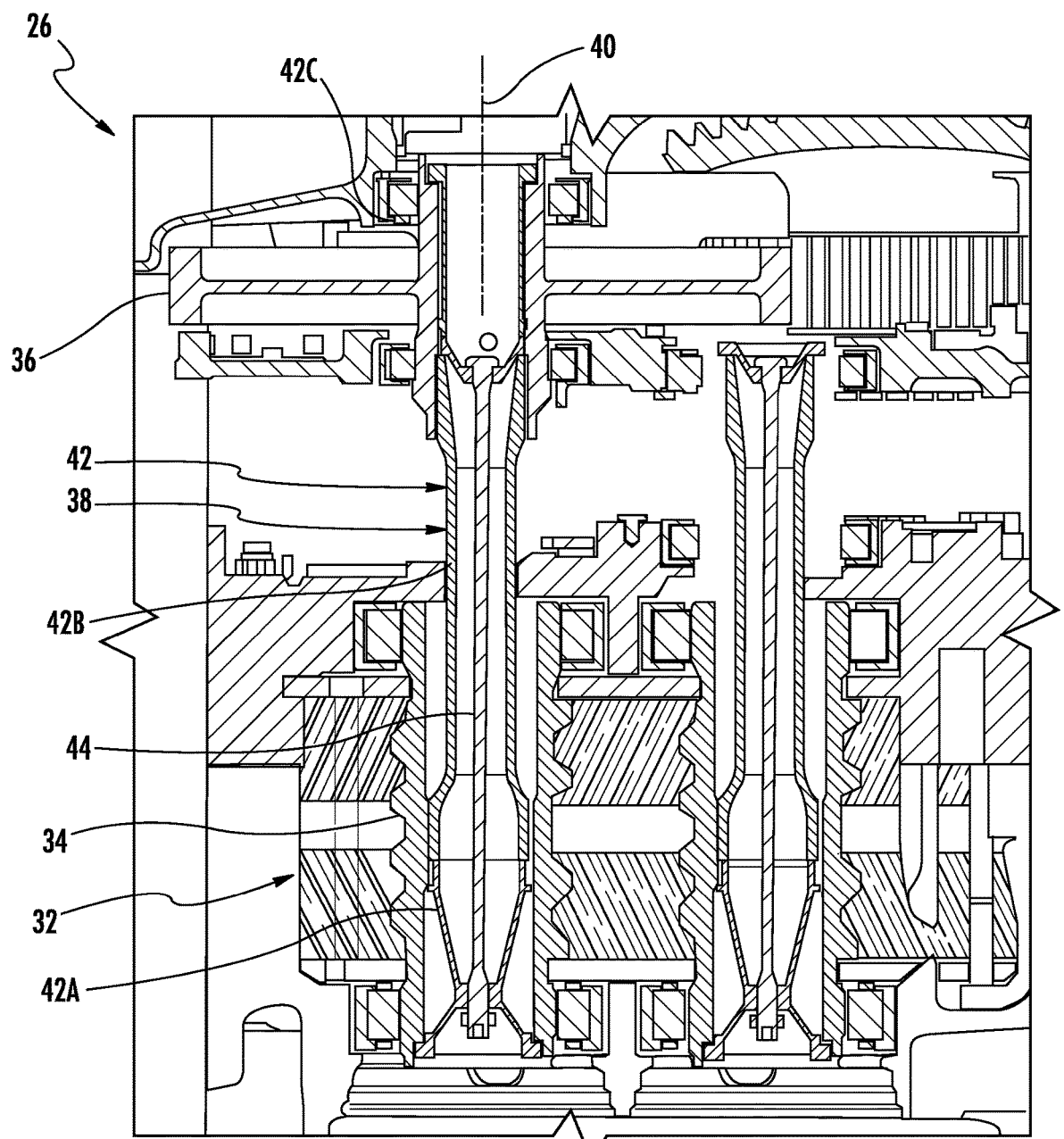
FIG. 2 is a partial cross section of the gear train as one, non-limiting, embodiment utilizing a vibration damping device.
Figure 3:
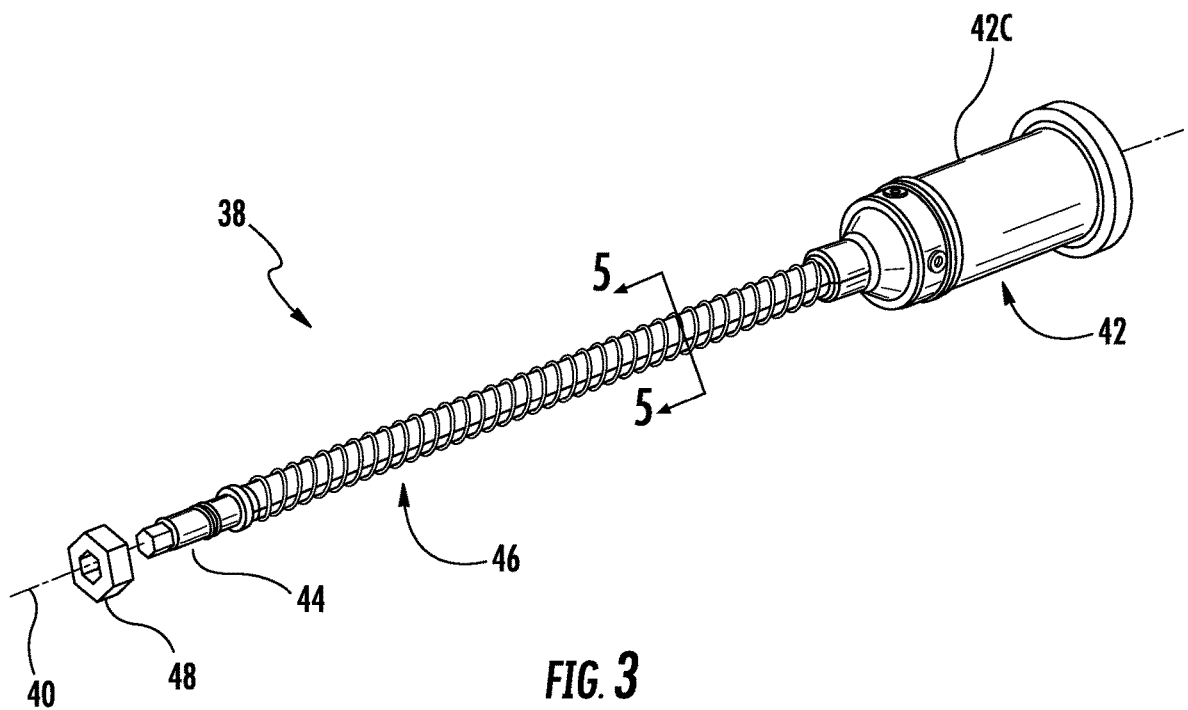
FIG. 3 is a perspective view a quill assembly having the vibration damping device.
Figure 4:
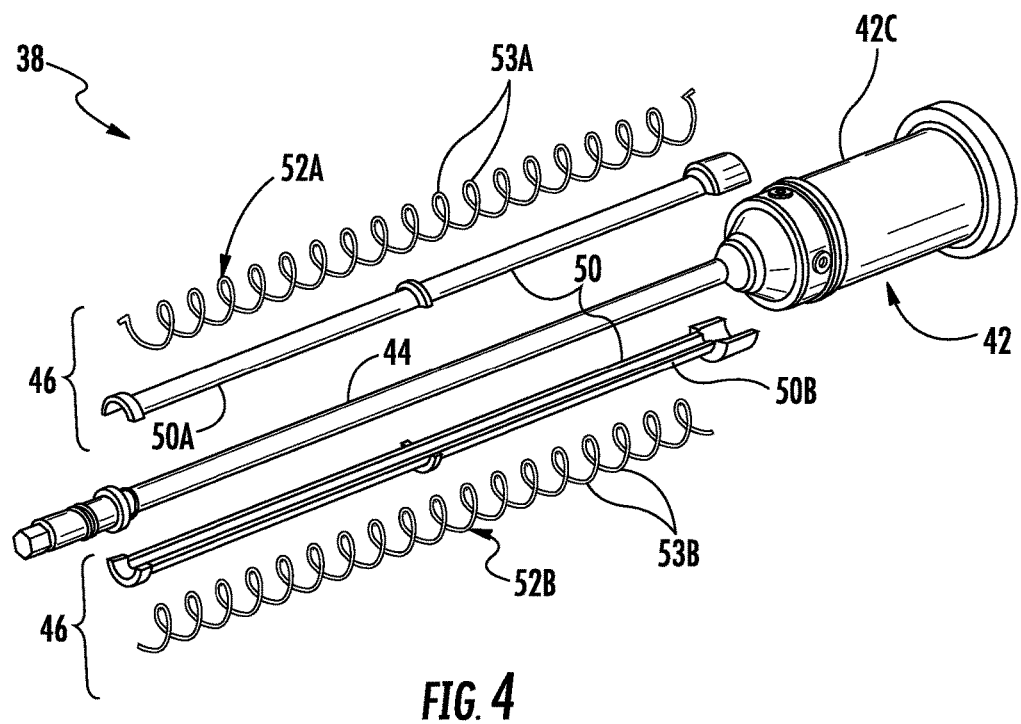
FIG. 4 is an exploded perspective view of the quill assembly.

Referring to FIGS. 2 through 4, the gearbox 26 is illustrated as one, non-limiting, example of an application for a gear train 32 (i.e., two illustrated). The gear train 32 may include a first gear 34, and second gear 36, and an elongated quill assembly 38 engaged to the gears 34, 36 and extending there-between. The quill assembly 38 is configured to rotate about an axis 40 along with the gears 34, 36. As shown, the gears 34, 36 are concentrically located to rotate about axis 40 with the quill assembly 38, however the invention is not limited thereto. While not restricted thereto, the elongated quill assembly 38 may have a length over diameter ratio of greater than ten (10), however it is understood that aspects of the present disclosure could be used with other ratios.

The quill assembly 38 may include a generally hollow quill shaft 42, a connecting rod or elongated member 44, and a vibration damping device 46 configured to dampen vibration (i.e., lateral flexing) of the rod 44. The quill shaft 42 may include a plurality of axially divided segments 42A, 42B, 42C (i.e., three illustrated in FIG. 2) with segment 42A being rigidly engaged to the gear 34, segment 42C rigidly engaged to gear 36, and segment 42B being in axial contact with and extending axially between segments 42A, 42B. More specifically, the shaft segment 42B may be under axial compression between segments 42A, 42C which are axially biased against segment 42B by the connecting rod 44. Each end of the shaft segment 42B may be rotationally connected to the respective gears 34, 36 by a spline arrangement. The shaft segments 42A, 42C may be engaged (e.g., a threaded arrangement) to the respective gears 34, 36. The gears 34, 36 are generally concentric to and project radially outward from the respective shaft segments 42A, 42C.

The quill shaft 42 (and to a limited degree the connecting rod 44) facilitate the transfer of rotational energy from the second gear 36 to the first gear 34 and may be under a torsional force. The rod 44 is generally spaced radially inward of the hollow shaft 42 and facilitates an axial connection of the shaft segments 42A, 42B, 42C together. A fastening mechanism, such as a nut 48 may be threaded to one end of the rod 44 and torqued to a pre-specified amount providing a desired axial force to clamp the segments 42A, 42B, 42C axially together. That is, the rod 44 is under tension, and although the rod 44 may slightly twist with the quill shaft segment 42B, it is generally not under a torsional force during operation (i.e., rotation).

The vibration damping device may include a split sleeve 50 and at least one coiled spring 52A, 52B (i.e., two illustrated) with each spring 52A, 52B having a plurality of coils 53A, 53B, respectively. When assembled, the split sleeve 50 substantially surrounds the rod 44 and the springs 52A, 52B are coiled or helically wrapped about the sleeve 50. Each coil 53A of the first spring 52A may be axially adjacent to and spaced from a respective coil 53B of the second spring 52B. During operation, and as the shaft 42 and rod 44 spin together about axis 40, the gears 34, 36 may introduce vibration into the rod 44 over a wide range of vibration frequencies. Such frequencies may cross a number of critical modes that could create a resonating vibration causing high stresses in the rod 44. The vibration damping device 46 dampens this vibration. The sleeve 50 and the springs 52A, 52B that generally surround the rod 44, together, facilitate damping of the vibration. That is, the radial movement or flexing of the rod 44 due to vibration is limited by the sleeve 50 and the springs 52A, 52B that absorb the vibration energy and reduce the amplitude of the vibration.

Figure 5:
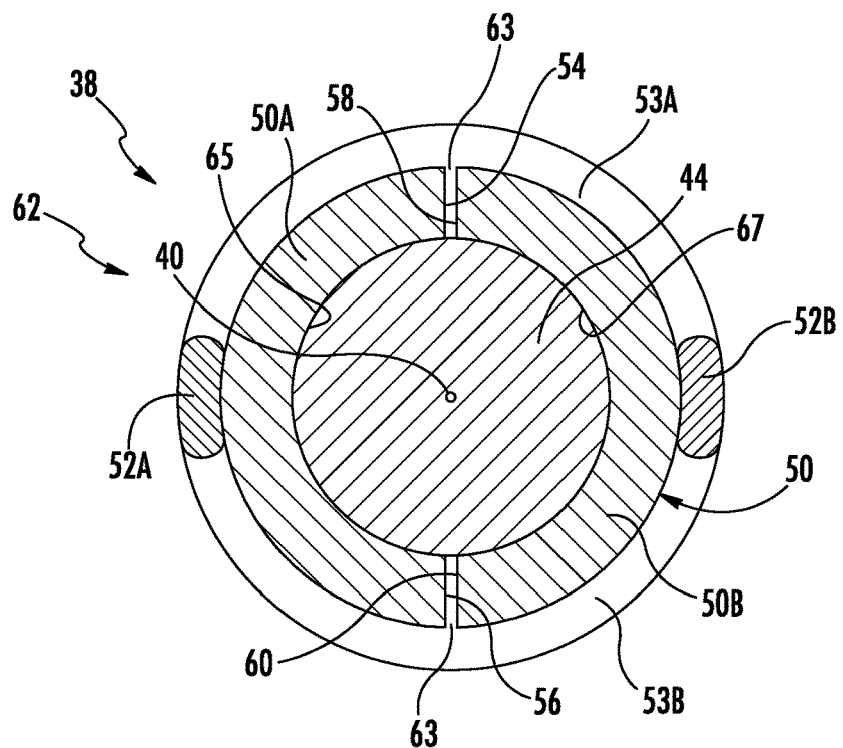
FIG. 5 is a cross section of the vibration damping device installed about an elongated member in an un-flexed state, and taken along line 5-5 of FIG. 3.

Referring to FIGS. 4 and 5, to accomplish vibration damping, the sleeve 50 of the vibration damping device 46 may be split in an axial direction and/or bisected in the axial direction forming separate first and second segments 50A, 50B of the sleeve 50 (i.e., a clam shell arrangement). Each segment 50A, 50B may extend the full axial length of the assembled sleeve 50 and may span circumferentially each forming a cross sectional semicircle. More specifically, segment 50A spans circumferentially between and carries opposite, axially extending, edges 54, 56; and, segment 50B spans circumferentially between and carries opposite, axially extending edges 58, 60. When the sleeve 50 is fully assembled and the vibration damping device 46 and the rod 44 are in an un-flexed state 62 (see FIG. 5), edges 54, 56 of the first segment 50A are opposed to and may be slightly spaced circumferentially (i.e., see gap 63 in FIG. 5) from the respective edges 58, 60 of the second segment 50B. Also when in the un-flexed state 62, the radially inward surfaces 65, 67 of the respective sleeve segments 50A, 50B may be in substantial contact with the connecting rod 44.

Figure 6:
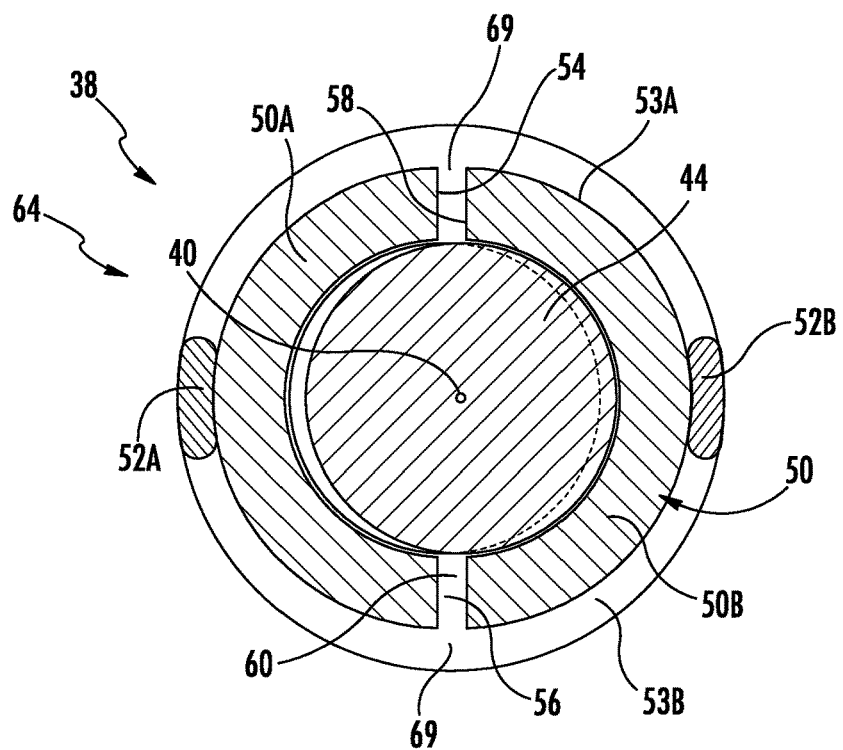
FIG. 6 is a cross section of the vibration damping device and the elongated member in a flexed state.

Referring to FIG. 6, the vibration damping device 46 and the rod 44 are illustrated in a flexed state 64. When the rod 44 is flexing laterally, due to vibration transmitted from the gears 34, 36 (as one, non-limiting, example), the flexed rod 44 pushes radially outward upon the split sleeve 50 causing the opposing edges 54, 58 and opposing edges 56, 60 of the respective sleeve segments 50A, 50B to separate further against the biasing force of the springs 52A, 52B, thus forming a gap 69 that is larger than the gap 63 of the un-flexed state 62. This controlled and/or limited separation generally causes an outer diameter of the split sleeve 50 to generally increase, which in-turn causes the diameter of the spring coils 53A, 53B proximate to the flexing to also increase. The increase in coil diameter causes the axial length of the springs 52A, 52B to decrease. The internal resiliency of the springs 52A, 52B and a frictional force between the springs 52A, 52B and the outer surface of the split sleeve 50 generally contribute toward the biasing force that resists rod flexing thereby damping vibration.

Figure 7:
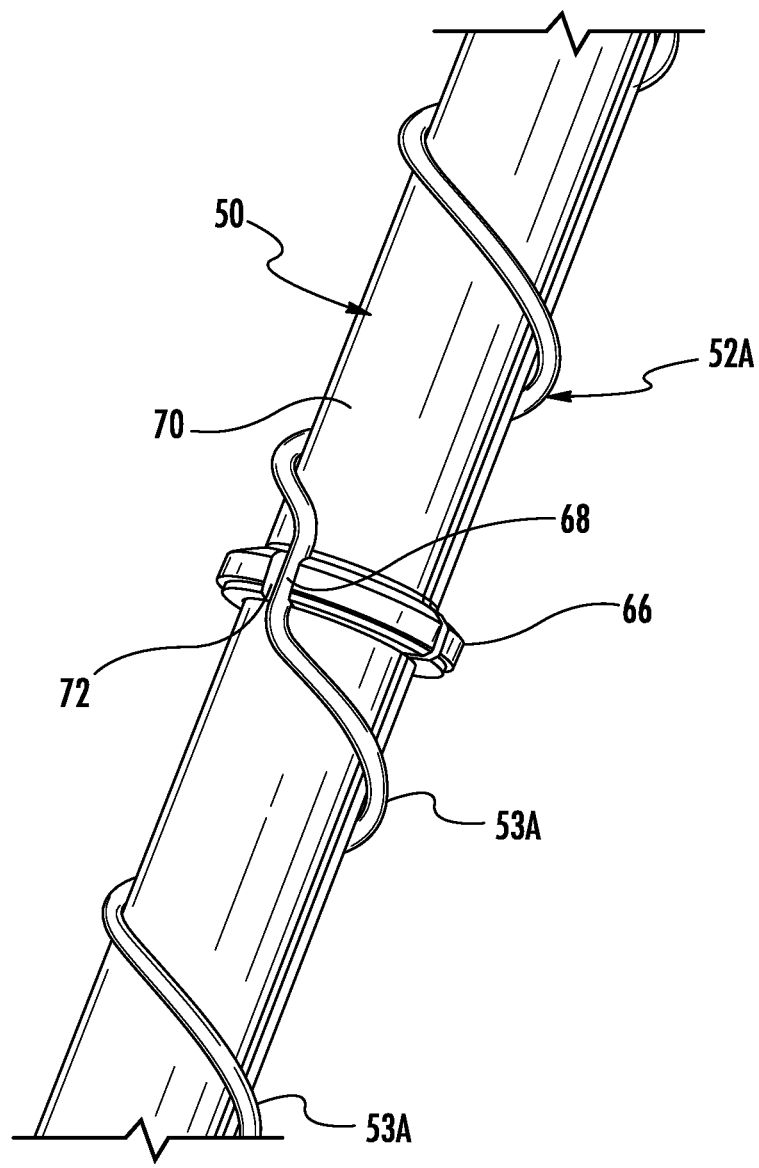
FIG. 7 is a partial perspective view of vibration damping device illustrating an indexing means.

Referring to FIG. 7, an axial indexing mechanism carried between the sleeve 50 and the springs 52A, 52B may include, as one non-limiting example, a collar 66 of the sleeve 50, and an axially extending portion 68 of each spring 52A, 52B. The collar 66 may project radially outward from an outer, cylindrical, surface 70 of the sleeve 50 and may define at least one groove 72 that is opened radially outward and communicates axially through the collar 66. The substantially straight portion 68 of each spring 52A, 52B may be axially located at about mid length of the springs, thus each portion extends between adjacent coils 53A, 53B, respectively. When assembled, the portions 68 of each spring 52A, 52B fits within a respective groove 72 preventing the springs from axially shifting with respect to the sleeve 50.

The springs 52A, 52B may be made of a steel that resists plastic deformation, and the split sleeve 50 may be made of brass or bronze. Although described as a connecting rod 44, rod 44 may be any elongated member applied to any application. The elongated member 44 may be configured to rotate or may be stationary, albeit under a vibration mode that causes lateral deflection. Elongated members 44 that may benefit from use of the vibration damping device 46 may have an axial length over width (e.g., diameter) ratio of about greater than ten.

The vibration damping device 46 may be easily applied to pre-existing elongated members 44 without requiring design changes to the member. During assembly, the segments 50A, 50B of the split sleeve 50 are installed over the elongated member 44 generally from opposite radial directions. At least one of the springs 52A, 52B may then be installed about the sleeve 50. When placing the springs 52A, 52B, the portions 68 of the respective springs may be inserted into the respective grooves 70 of the collar 66.

While the present disclosure is described with reference to exemplary embodiments, it will be understood by those skilled in the art that various changes may be made and equivalents may be substituted without departing from the spirit and scope of the present disclosure. Further, while described in the context of a rotary wing aircraft having a single rotor, it is understood that aspects of the present disclosure may be used in coaxial or dual rotary wind aircraft, fixed wing aircraft, industrial machinery, maritime transmissions or the like without limitation. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A vibration damping device for reducing lateral displacement of an elongated member extending along a centerline, the vibration damping device comprising:
    a split sleeve co-extending with and disposable about the elongated member; and
    a first spring extending about the sleeve and configured to exert a force that biases the sleeve radially inward against the elongated member to react against lateral motion of the elongated member, wherein the first spring is a coiled spring constructed and arranged to helically wrap about the sleeve.

2. The vibration damping device set forth in claim 1, wherein the sleeve is bisected longitudinally into separate first and second segments.

3. The vibration damping device set forth in claim 1, wherein the first edge of the first segment and the second edge of the second segment define a first gap there-between when in an un-flexed state, and define a second gap that is larger than the first gap when in a flexed state against the biasing force of the first spring.

4. The vibration damping device set forth in claim 1, wherein the second edge of the first segment and the first edge of the second segment define a third gap there-between when in the un-flexed state, and define a fourth gap that is larger than the third gap when in the flexed state against the biasing force of the first spring.

5. The vibration damping device set forth in claim 1, wherein the first and second segments are geometrically identical.

6. The vibration damping device set forth in claim 1, further comprising:
    a second coiled spring including a plurality of coils with each coil extending circumferentially about the sleeve, and wherein each coil is axially adjacent to and spaced from a respective coil of a plurality of coils of the first spring.

7. The vibration damping device set forth in claim 1, wherein the first spring is disposed at least in part in a groove defined by the sleeve.

8. The vibration damping device set forth in claim 7, wherein the sleeve includes a collar projecting radially outward and the groove is defined by the collar.

9. The vibration damping device set forth in claim 1, wherein the vibration damping device is part of a drive system quill assembly, the elongated member is a connecting rod of the drive system quill assembly, and the centerline is a rotational axis.

10. A gear train comprising:
    a first gear orientated to rotate about an axis;
    a second gear orientated to rotate about the axis; and
    a quill shaft assembly extending axially between the first and second gears, and including a quill shaft engaged to the first and second gears and including a plurality of segments, a connecting rod concentrically disposed inside the quill shaft and configured to hold the plurality of segments axially together, a split sleeve disposed about the connecting rod, and a first spring extending about the sleeve for exerting a force that biases the sleeve radially inward against the quill shaft for damping vibration of the quill shaft.

11. The gear train set forth in claim 10, wherein the rod is under tension and at least one segment of the plurality of segments of the quill shaft carries a torque.

12. The gear train set forth in claim 10, wherein the gear train is part of a split torque gear box.

13. The gear train of claim 12, wherein the rear train is part of an aircraft.

\* \* \* \* \*